US009189452B2

(12) United States Patent
Hahne

(10) Patent No.: US 9,189,452 B2
(45) Date of Patent: Nov. 17, 2015

(54) METHOD AND A DEVICE FOR GENERATING ARTIFICIAL DRIVING NOISES OF A VEHICLE

(71) Applicant: GM Global Technology Operations LLC, Detroit, MI (US)

(72) Inventor: Uwe Hahne, Buettelborn (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 134 days.

(21) Appl. No.: 13/716,046

(22) Filed: Dec. 14, 2012

(65) Prior Publication Data
US 2013/0158795 A1  Jun. 20, 2013

(30) Foreign Application Priority Data

Dec. 15, 2011  (DE) .......................... 10 2011 121 284

(51) Int. Cl.
*G06F 17/00* (2006.01)
*B60Q 5/00* (2006.01)
*G08G 1/16* (2006.01)

(52) U.S. Cl.
CPC .............. *G06F 17/00* (2013.01); *B60Q 5/008* (2013.01); *G08G 1/16* (2013.01)

(58) Field of Classification Search
CPC .......... B60Q 5/008; B60Q 5/00; B60Q 5/005; G06F 17/00; G08G 1/16
USPC ......................................................... 381/86
See application file for complete search history.

(56) References Cited

U.S. PATENT DOCUMENTS

| | | | | |
|---|---|---|---|---|
| 7,979,147 B1* | 7/2011 | Dunn | ............................ | 700/94 |
| 2009/0066499 A1* | 3/2009 | Bai et al. | ....................... | 340/459 |
| 2010/0201506 A1* | 8/2010 | Terry | ............................ | 340/431 |
| 2010/0228434 A1* | 9/2010 | Leyerle | ........................... | 701/36 |
| 2011/0032122 A1* | 2/2011 | Hayashi et al. | ............... | 340/943 |
| 2011/0044470 A1* | 2/2011 | Ogata | ............................ | 381/86 |
| 2011/0199199 A1 | 8/2011 | Perkins | | |
| 2012/0130580 A1* | 5/2012 | Omote et al. | ................... | 701/22 |
| 2012/0179280 A1 | 7/2012 | Faye | | |

FOREIGN PATENT DOCUMENTS

| | | |
|---|---|---|
| DE | 102004050597 A1 | 4/2006 |
| DE | 102005035040 A1 | 4/2006 |
| DE | 102009037170 A1 | 2/2011 |

(Continued)

OTHER PUBLICATIONS

German Patent Office, Search Report for German Application No. 102011121284.5, dated Jun. 29, 2012.

(Continued)

*Primary Examiner* — Helal A Algahaim
*Assistant Examiner* — Genna Mott
(74) *Attorney, Agent, or Firm* — Ingrassia Fisher & Lorenz PC

(57) ABSTRACT

A device and a method for generating artificial driving noises for a motor vehicle, and to a computer program for carrying out the method is provided. Environmental conditions, objects and/or other road users are recorded via an environmental sensor unit. Depending thereupon and, as required, depending upon vehicle-internal information driving noises are generated with special properties. In this way other road users can be alerted to otherwise quietly driving vehicles.

17 Claims, 2 Drawing Sheets

(56) References Cited

FOREIGN PATENT DOCUMENTS

| | | | |
|---|---|---|---|
| DE | 102010006633 A1 | | 4/2011 |
| DE | 102009057683 A1 | | 6/2011 |
| WO | WO 2011148534 A1 | * | 12/2011 |
| WO | 2012059285 A1 | | 5/2012 |

OTHER PUBLICATIONS

Great Britain Patent Office, Great Britain Search Report for Great Britain Application No. 1221693.3, dated Mar. 25, 2013.

* cited by examiner

METHOD AND A DEVICE FOR GENERATING ARTIFICIAL DRIVING NOISES OF A VEHICLE

CROSS-REFERENCE TO RELATED APPLICATION

This application claims priority to German Patent Application No. 10 2011 121 284.5, filed Dec. 15, 2011, which is incorporated herein by reference in its entirety.

TECHNICAL FIELD

The technical field relates to a method and a device for generating artificial driving noises of a vehicle. The present disclosure further relates to a computer program.

BACKGROUND

The recently developed low-noise motor vehicles now available on the market such as hybrid vehicles and electrical vehicles, emit hardly any driving noise insofar as they are operated by an electric motor. Such vehicles are very hard to detect with the human ear during driving. In order to minimize the risk of accidents with other road users who are not at all or only very faintly aware of these low-noise vehicles, the DE 10 2010 006 633 A1 has disclosed a way of warning other approaching road users in good time by a special signal emitted by such an approaching vehicle. To this end the motor vehicle comprises a sensor system which is able to record weaker road users in the vicinity. Depending upon the traffic situation or type of road user different warning signals are emitted or the warning signals are emitted at different points in time. The warning signals can be adapted to suit the traffic situation. The warning signals emitted are acoustic signals or optical signals (horn or headlamp flasher) of varying intensity.

In addition, other objects, desirable features and characteristics will become apparent from the subsequent summary and detailed description, and the appended claims, taken in conjunction with the accompanying drawings and this background.

SUMMARY

According to various aspects of the present disclosure, provided is a method, device and computer program to increase acoustic awareness of low-noise vehicles in order to minimize the danger of accidents involving other road users.

Accordingly provision is made for generating artificial driving noises of a motor vehicle, wherein an environmental sensor unit emits and/or receives optical, acoustic and/or electromagnetic signals, in order to detect other road users who should be made aware of the approaching vehicle, or any objects which allow respective environmental conditions to be detected. A control signal controls the transmission of signals as well as their reception and evaluates the received signals in order to detect respective objects such as road users. A sound generating unit is driven by the control unit in order to generate artificial driving noises depending upon the type of the received signal and to emit these acoustically to outside.

The advantage of the present disclosure results in creating acoustic awareness of otherwise quiet vehicles in that based on the type of recorded object (road users or certain traffic conditions), relative movement of vehicle and object and the driving situation, correspondingly adjustable driving noises are generated for creating awareness of the approaching vehicle.

In one exemplary embodiment, the properties of the generated driving noises are dependent upon the location of the motor vehicle detected via the environmental sensor unit. Thus the driving noises can only be generated at those locations or be generated especially intensively only at those locations where increased awareness of approaching motor vehicles is necessary, such as for example in traffic-calmed zones or on play streets. On motorways the driving noise is, as a rule, of secondary importance.

In another exemplary embodiment, the properties of the generated driving noises are dependent upon the vehicle speed. Thus awareness can be drawn in good time and with increased intensity to motor vehicles rapidly approaching a road user. Such motor vehicles are therefore detected earlier.

In another exemplary embodiment, the properties of the generated driving noises are dependent upon the recorded movement and/or type of recorded road users. Thus the recorded movement of a pedestrian towards the road on which the respective motor vehicle is approaching, can result in distinctly better detectable driving noises than the movement of a pedestrian moving away from the road. Also the reaction to children may be different, since their behavior has to be rated differently from that of an adult.

In another exemplary embodiment, the properties of the generated driving noises are dependent upon the vehicle-internal parameters such as data regarding the current driving style or the driving style stored for the driver. This has the advantage that awareness is drawn more noticeably and possibly more quickly, to a sportily driven motor vehicle. It is sufficient to merely emulate the driving noises of a sports car in order to draw the attention of other road users to an otherwise quiet, quickly approaching, sportily driven motor vehicle.

In another exemplary embodiment, the properties of the generated driving noises are dependent upon the current loading and/or the current trailer load. Since heavily loaded motor vehicles or motor vehicles with a trailer have a distinctly longer braking distance, awareness of such vehicles can be created much earlier. Also intensity, sound or type of the motor vehicle may be utilized to specifically raise awareness of trucks with trailers.

In another exemplary embodiment, the properties of the generated driving noises are dependent upon the current driving speed or relative speed between motor vehicle and detected road user. The faster a motor vehicle is driving, the louder the artificially created driving noises can be. Thus other road users are alerted in good time to the approaching motor vehicle. If the road user is a cyclist, moped rider or similar vehicle driver driving in the same or the opposite direction, the early warning and the properties of the driving noise may depend upon the relative speed between motor vehicle and road user.

In another exemplary embodiment, the properties of the generated driving noises are dependent upon the current geographical position of the motor vehicle ascertained via an vehicle-internal positioning system. Thus the driving noises may be adapted to regional or country-specific local conditions and be automatically adjusted as borders between countries are crossed. The positioning data may also be transmitted telemetrically (by mobile radio, internet, radio) from outside into the motor vehicle.

In another exemplary embodiment, the properties of the generated driving noises may be freely selected and stored according to the driver's preferences. Thus every driver can freely choose his/her own driving noises (for example from a list of predefined driving noises) and even permanently store his/her settings which means that they are automatically set as he enters the vehicle and is recognized on insertion of the key.

In another exemplary embodiment, the properties of the generated driving noises are dependent upon the type and/or intensity of the current environmental conditions recorded by the environmental sensor unit. Thus for example, the driving noises may be adapted to the noise level in the surrounding area so that the motor vehicle, even in loud surroundings, as it approaches another road user who should be alerted to an approaching vehicle, can still be clearly detected. When the surrounding area is quiet, such as at night, the noise level created by the artificially generated driving noises may be kept lower than during the day, thus alerting close-by road users to the driving noise, but without local residents being disturbed by the artificially generated driving noises.

In another exemplary embodiment, the properties of the generated driving noises are dependent upon type of vehicle and kind of vehicle. Thus a noise generated for an open top car may be different from a noise generated for a limousine. For an open top car the driving noises set may be varied depending on whether the driver drives with the top open or closed. This allows the acoustic effect on the driver to be minimized whilst the effect upon other road users is increased.

In another exemplary embodiment, the properties of the generated driving noises are dependent upon data conveyed via a so-called car-to-car communication and/or a car-to-X communication. With such car-to-car communication data relating to a danger point for example may be sent from one vehicle to a following vehicle and/or to a vehicle approaching from the opposite direction and/or a vehicle within communication range. Accordingly the driving noise may be adapted in order to alert for example other road users that they are approaching a danger point. This applies, of course, not only to danger points but also to any other special traffic conditions such as pile-ups, diversions and the like. Furthermore with car-to-X communication such data can be communicated for example from a fixed hotspot.

In another exemplary embodiment, the properties of the generated driving noises are dependent upon road signs detected by the environmental sensor unit, in particular by at least one camera. Thus, for example, signs indicating traffic-calmed zones may be detected and driving noises may be attenuated accordingly or switched-off. It goes without saying that this also applies to any other type of road sign such as danger signs, pedestrian crossing signs and such like.

Another of various aspects of the present disclosure provides a computer program with program code means which when executed on a programmable processor unit causes the above described method to be carried out.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

The exemplary embodiments of the present disclosure (device or method) will now be explained in detail with reference to FIGS. 1 and 2.

Figure 1:
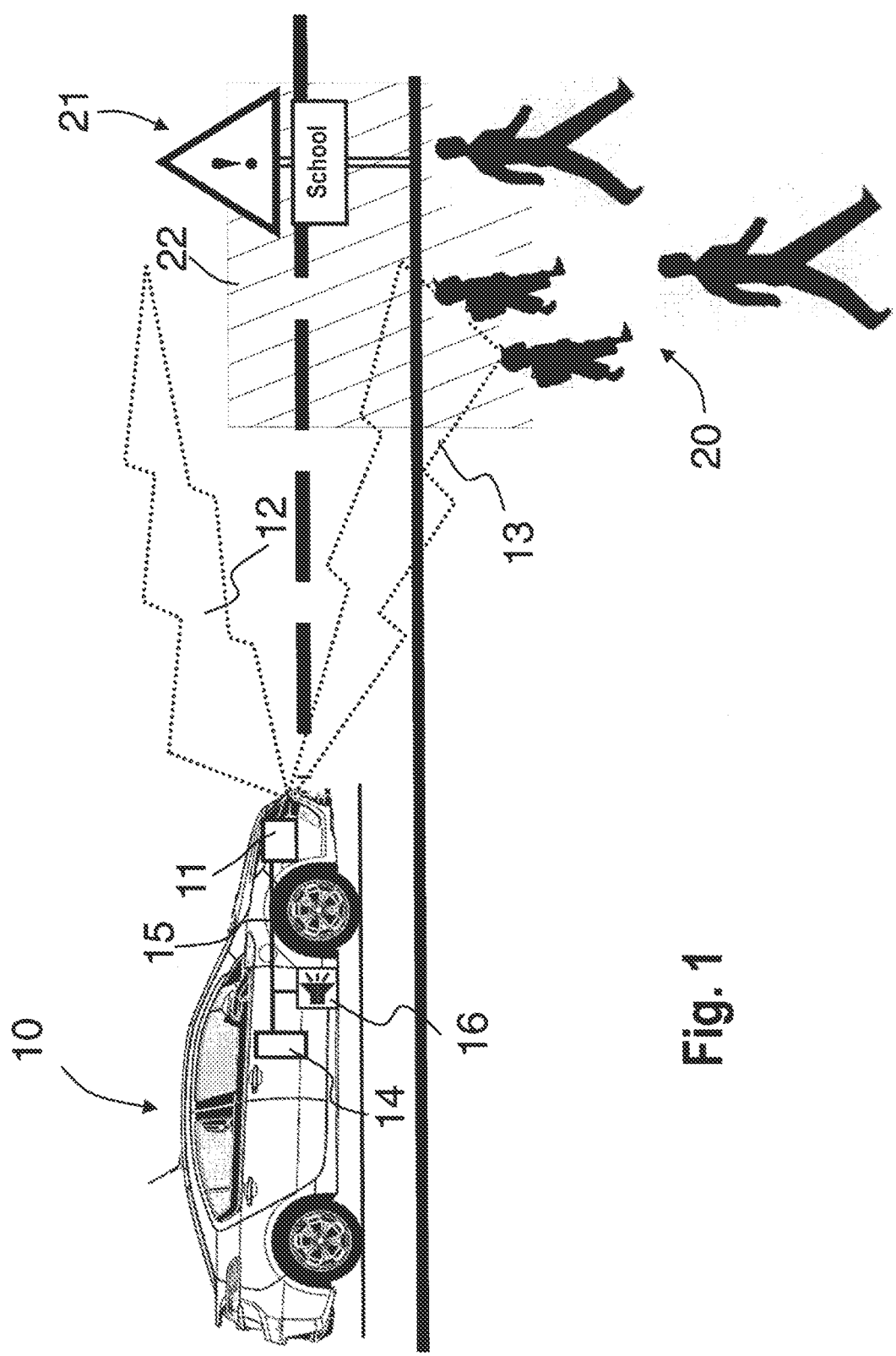
FIG. 1 shows a schematic view of a traffic situation in which a motor vehicle according to an exemplary embodiment approaches a pedestrian group.

FIG. 1 shows a device for generating artificial driving noises of a motor vehicle 10. The device comprises an environmental sensor unit 11 which detects objects, in one example, objects present in driving direction, such as other road users 20, traffic signs 21 or other relevant objects in the vicinity or close environment. In one example, it detects road users 20 who are to be acoustically alerted to an approaching but relatively quiet motor vehicle 10, and which will soon be in the driving path to be used by motor vehicle 10 or which will shortly be approaching motor vehicle 10. Such road users 20 are, in one example, pedestrians, cyclists, moped riders or motor cyclists, cabrio drivers etc. These road users 20 are not to be warned, but to be acoustically alerted to the approaching motor vehicle 10. Generally, objects are recorded which indicate special traffic situations such as pedestrian areas, play streets, traffic-calmed zones, children playing near schools or nurseries etc.

The environmental sensor unit 11 emits optical, acoustic and/or electromagnetic signals 12 to the outside and receives signals 13 from the outside. The signals 12 to be emitted are substantially emitted in driving direction or in direction of the intended driving path in order to detect road users 20 or other objects present in the driving path. The environmental sensor unit 11 can also receive signals 13 such as electromagnetic signals emitted by transponders (responding automatically to a received signal; RFID technology), mobile phones or other devices carried by others. Also electromagnetic rays (radar rays) reflected from objects, or optical signals 13 of the objects, can be received by a camera or an optical sensor.

The environmental sensor unit 11 may also be sensitive to environmental noises. A camera system may be used to detect other road users 20, traffic signs 21 or similar objects. Telemetric systems (GPS, navigation system, internet, mobile radio etc.) may be used to communicate to the environmental sensor unit 11 the position of motor vehicle 10 and the exact road layout in the vicinity or special facilities such as schools or nurseries. These received data are then used/evaluated in exactly the same way as the other received signals 13.

A control unit 14 controls the emission and reception of signals 12 or 13. The received signals 13 are evaluated in the control unit 14 possibly together with vehicle-internal signals such as vehicle speed or other data from motor vehicle 10. At any rate, this data is already present in motor vehicle 10 so that it does not need to be recorded separately. The control unit 14 may be an autonomous unit within the motor vehicle 10 or may be integrated with the environmental sensor unit 11. All vehicle-internal signals/data may be transmitted to the control unit 14 via a data bus 15 to which all control devices and units in the motor vehicle are connected.

A sound generating unit 16 is connected with the control unit 14 and is driven accordingly in order to generate artificial driving noises with corresponding properties and acoustically emit these to the outside. Such driving noises may be engine noises (combustion engine, electric motor), tire rolling noises or the like. The driving noises are typically noises as created when driving a conventional motor vehicle. The driving noises may also be specifically designed to make the motor vehicle 10 sound in a particular manner. In the simplest case the sound generating unit 16 is a loudspeaker with a corresponding driver/amplifier. Or the driving noises may exhibit a typical characteristic such as when revving up an engine or the like.

The artificial driving noises have the effect of alerting other road users 20 to the approaching, otherwise quiet motor vehicle 10, and who might be at risk of becoming involved in an accident with motor vehicle 10. The driving noises may be generated based on the type of road user 20 recorded near-by, the way in which he moves, the current traffic situation and/or the current environmental conditions, with respect to their properties such as type, intensity, time duration, switch-on/switch-off time and sound.

The properties of the generated driving noises may be dependent upon the location of the moving motor vehicle detected via the environmental sensor unit 11, relative to the detected object. Thus the artificially created driving noises may be adapted to the current driving situation. If a traffic-calmed zone, a pedestrian zone, the area of a hospital, a school or nursery or other zone with a lot of pedestrian traffic is detected by the environmental sensor unit 11, the driving noises may be set to constantly remain somewhat louder, even if no other road users 20 such as pedestrians or cyclists are detected in the immediate danger zone in driving direction. Outside of towns and villages or on motorways the artificially created driving noises are suppressed or emitted merely quietly, unless pedestrians, animals or cyclists are detected on the carriageway or in the vicinity of the carriageway in driving direction and thus within the potential danger zone 22 (shown by the broken line in FIG. 1). The properties of the driving noises may also depend upon the type of object. If, for example, a guide dog for the blind is detected, additional sound frequencies within the driving noises may be generated which in particular are heard by the guide dog, such as infrasound signals.

The properties of the driving noises may also be different for pedestrians and cyclists. The point in time for switching on the driving noises may be different for different road users 20. The point in time for switching on the driving noises and the time duration of the driving noises may also depend upon the relative speed between motor vehicle 10 and road user 20 as well as the direction of movement of the one or the several road users 20.

Also, the properties of the generated driving noises may be dependent upon the vehicle's own driving speed. The faster the vehicle is driving, the longer the braking distance. It is therefore important that the relevant road users 20 are alerted clearly and in good time to the approaching motor vehicle 10. Another factor important to the relevant road users 20 is the speed at which a motor vehicle 10 is approaching.

The properties of the generated driving noises may also be dependent upon the recorded direction of movement of objects such as animals or persons and/or type of recorded object. FIG. 1 shows a group of pedestrians by the side of the road. The control unit 14 detects the group of people as being relevant road users 20 present in the area of the anticipated or possible driving path in the immediate vicinity (on the carriageway or directly next to it). The control unit 14 is able to detect the people moving. Should the pedestrians move towards the road on which the respective motor vehicle 10 is approaching, the driving noises may be switched on earlier and so as to be clearly more detectable. If the people or animals are already on the carriageway this must also be detected followed by a specific reaction with respect to the driving noises.

If the control unit 14 detects children in the group of pedestrians, the driving noises may be switched on at an earlier time and with more volume, since the traffic behavior of children is known to be somewhat unpredictable. In order to detect children and thus the size of people, comparisons with reference variables in the vicinity are necessary, however. Such reference variables may, for example, be traffic signs 21, signposts or roadside beacons.

It is sufficient not to switch on the driving noises until people are within hearing distance and then to make them distinctly more perceptible. The hearing distance depends upon the environmental noises on the one hand and the volume/intensity of the artificially created driving noises on the other. The maximum volume of the driving noises should be such that a motor vehicle 10 can be heard by the human ear at a distance of about 50-100 m maximum (for a quiet environment). When driving very slowly (for example about 30 km/h), it is sufficient if the motor vehicle is heard at the latest at a distance of approximately 30 m.

The properties of the generated driving noises may also be dependent upon vehicle-internal signals for the current mode of driving or the currently set style of driving for the driver. The mode of driving is to be found in the onboard computer, the engine control or the transmission control. It is either stored in there for the driver (the driver can choose between different styles of driving, such as sporty or economical) or is to be found in earlier data for the trip using for example an acceleration profile. If the driver has earlier been driving in a sporty way or the sporty driving style is currently set for the driver, more note must be taken of the relative speed and the change in relative speed to the detected object or road user 20, and the detected road users 20 must be alerted to the approaching motor vehicle 10 more clearly and possibly earlier in terms of time because of course the approach to the object is faster. In these cases therefore driving noises of a sports car may be artificially created in order to especially alert the other road users 20 to the motor vehicle 10 approaching in an otherwise quiet but quickly approaching sporty manner. For a more relaxed mode of driving the driving noises of a more sedately driving luxury limousine may be simulated. This gives other road users 20 a better chance to adjust their own behavior in relation to the approaching vehicle 10 based on these driving noises.

The properties of the generated driving noises may also be set depending upon the current loading or an attached trailer and its current trailer load. The total weight (dead weight plus loading) can be detected via the engine torque, since a higher total weight requires a higher engine output. An attached trailer is detected via the electric trailer coupling. Since heavier loaded motor vehicles 10 or motor vehicles 10 with trailers have a distinctly longer braking distance, attention may be drawn to these motor vehicles 10 at an earlier point in time. By varying the intensity, sound or type of a driving noise attention may be drawn specifically to trucks with trailers. The driving noises may be modified so as to make the typical tire rolling noise of a trailer distinctly more detectable.

In another exemplary embodiment the properties of the generated driving noises are dependent upon the current vehicle speed and vehicle acceleration. The faster or more dynamically a vehicle 10 drives, the louder can be the artificially generated driving noises. Thus other road users 20 are alerted earlier to the approaching vehicle 10. The point in time at which the driving noises are switched on may be adapted to the driving speed and acceleration/braking. When the vehicle brakes, the driving noise depends upon the force of braking and may be quieter than when accelerating quickly.

The geographical position of motor vehicle 10 can also have an influence upon the properties of the generated driving noises. The geographical position of motor vehicle 10 may be determined from data of a vehicle-internal navigation device and its positioning system or from other data transmitted wirelessly to motor vehicle 10, such as a radio network, the internet, LAN networks or the like. Thus the driving noises may be adapted to regional or country-specific local conditions or defaults and may be automatically adjusted when borders are crossed. As such the generated driving noises must not exceed country-specific noise protection limit values. Regional or local defaults also must be observed when generating driving noises, such as in areas nominated as quiet zones in spas. In these areas driving noise intensity should be adequate but all the same below the limit value, particularly at night.

The type of artificial driving noise should also be able to be chosen freely and modified by the driver. The driver may select from a more or less large number of different noises, depending on whether his vehicle 10 is to sound like a sporty Ferrari or more dignified like a Rolls Royce. It is also possible to set the driving noise to sound like a truck, in order to make road users 20 especially careful when they hear the noise. Other noises may be typical driving noises of so-called lifestyle vehicles such as an Opel Kadet, a Citroen 2CV or a Volkswagen beetle.

The chosen driving noises are then permanently stored in the motor vehicle 10 and may be retrieved by the driver at any time. Thus every driver can choose his driving noises as he or she pleases. Default driving noise values are stored as standard depending upon environmental conditions and way of behavior of road users 20 as well as upon driving situations, and these are modified (volume, time duration, switch-on/-off time or sound) on the basis of the recorded signals for the respective situation. In addition the driver can modify and store the properties of the driving noises for the respective situation. If such data are stored by individuals, the respective data may be retrieved when entering the vehicle 10, as soon as the driver is identified, for example by means of his car key or other individual biometrical features such as fingerprint or facial recognition. During the following drive the respectively recorded external signals then determine what properties are set for the driving noises depending upon the detected road users 20 and the traffic and driving situation.

The properties of the generated driving noises may also be set depending upon the type and/or intensity of the environmental conditions currently recorded via the environmental sensor unit 11. Thus the driving noises may be adapted for example, to the noise level in the vicinity so that even in a loud environment the motor vehicle 10 can still be distinctly detected, insofar as it is approaching another road user 20 who should be alerted to the presence of an approaching motor vehicle 10. For quiet environmental conditions, for example during the night, the noise level of the artificially created driving noises should be kept altogether lower than during the day, since during the night the driving noises are discernible more easily. As a result only road users 20 close-by will be aware of the driving noise, but local residents will be less disturbed by the artificially created driving noises. The driving noises can thus be made dependent upon the time of day and/or upon the environmental noises which can be recorded by the environmental sensor unit 11. In the vicinity of schools or nurseries for example, increased audibility can be ensured during typical school hours, even above the cries of children in the area. The driving noises may also be adjusted to be in tune with typical school hours/teaching hours as regards switching-on times or changing times for the intensity of the driving noises.

The artificial driving noises may also be dependent upon vehicle type and kind of vehicle. Thus an artificial noise generated for an open top car may be different from a noise generated for a limousine. For an open top car the driving noises set may vary depending on whether the driver drives with the top open or closed. If he drives with the top open the driver should not be affected too much by the artificially created driving noises. And the direction of emission of the driving noises should be set such that the noises are substantially directed in driving direction or in direction of the detected road users 20 or the potential danger area 22. In this way fewer sound emissions reach the remaining surrounding area.

Figure 2:
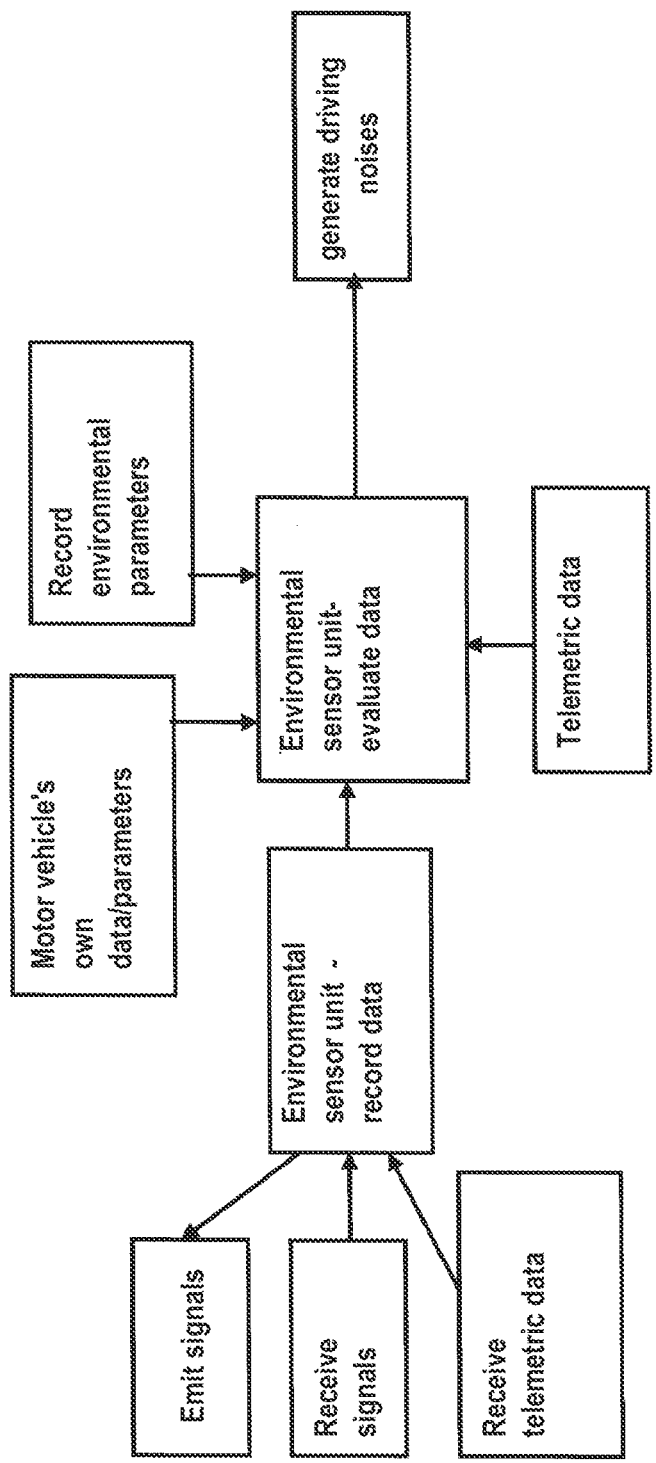
FIG. 2 shows a block/flow diagram for an exemplary method of the present disclosure.

FIG. 2 illustrates the method for generating artificial driving noises for a motor vehicle 10, as already explained with reference to FIG. 1. Signals are emitted in order to receive signals from external objects in response thereto. In addition parameters or objects are recorded without having previously emitted any signals. Moreover telemetric data (GPS, mobile radio, internet, radio) are gathered in order to evaluate objects in conjunction with the other recorded parameters/received signals. As soon as relevant objects (certain traffic zones, persons, animals etc.) have been recorded in the area of the impending traffic activity, driving noises with special properties are generated based on the properties/the behavior of objects and on additional parameters such as the vehicle's own parameters, environmental parameters, telemetrically received parameters etc. in order to acoustically alert road users 20 to the approaching motor vehicle 10 without emitting any additional warning signals. For the warning signals are typically substantially louder and are perceived as unpleasant by road users 20 more remote from the driving route and thus from the respective traffic activity. Warning signals are usually kept short and loud, whilst driving noises are quieter and of longer duration.

The artificial driving noises should be switched on in good time, i.e. so as to allow the motor vehicle 10, when braking, to come to a standstill before it reaches the danger zone 22. The noises should remain switched-on for at least a time span which is long enough for the motor vehicle 10 to go past the respective danger zone 22 (the location at which a recorded road user 20 could be involved in an accident with motor vehicle 10). Or until a detected, potentially endangered area (for example a play street) has been left behind. Within the detected area the properties of the driving noises can be changed as soon as an additional road user 20 is recorded who could represent a potential danger for an accident with motor vehicle 10.

According to various aspects, also provided is a computer program with program code means which when executed on a programmable processor unit, causes the above-described method to be performed. The processor unit may be arranged in the control unit 14 or in another processor unit already arranged in the motor vehicle 10, for example the environmental sensor unit 11 or another control device. All control devices and the control unit 14 could be connected with each other and with separate data stores via data bus 15, in order to record the corresponding data or generate signals and exchange data among each other. Programs such as image processing software for detecting the other road users 20 could then also be run on this processor.

The motor vehicle 10 with the device according to the present disclosure for alerting other road users 20 to an approaching motor vehicle 10 should not warn the other road users 20 by means of a conventional (classical) additionally generated warning signal, as this would require to be executed with a corresponding volume and would create a new kind of traffic noise. It is intended merely to generate a traffic noise which alerts other road users 20 to the presence of motor vehicle 10 which is approaching quietly. It shall also be possible, on the basis of various parameters, to modify and switch the driving noises on or off at appropriate points in time. Alternatively the driving noises may remain constantly switched-on, wherein for detected and relevant traffic users 20 the intensity/volume is increased whilst in other respects, perceptibility of the driving noises remains relatively low. The effect of the driving noises shall be like a normal motor vehicle approaching the danger zone 22. It is the advantage of the artificial driving noises that their properties can be modified depending upon the detected object such as a road user 20 and other parameters.

DEFINITIONS

The term "road user 20", as used herein, describes relevant persons or animals which have influence upon the traffic activities taking place in the immediate vicinity/surrounding area and which could be involved in an accident due to the approaching vehicle 10 and their own behavior in the potential danger zone 22 (potential point of intersection of the two). The road users 20 shall be acoustically alerted to the approaching, otherwise quiet motor vehicle 10. "Objects" are understood to mean detected objects relevant to the traffic activities in the direction of driving such as traffic signs 21, special usage zones (such as play streets, pedestrian crossings, pedestrian zones, etc.) special usage buildings such as hospitals, schools, nurseries, etc.

The term "driving noise", as used herein, refers to noises of a motor vehicle 10 which this vehicle creates. These noises comprise engine noises (of a combustion engine or an electric motor) or tire rolling noises or other driving noises. The "properties" of the generated driving noises may differ by type, intensity, sound, intensity progression, respective time durations thereof, switching-on or switching-off times, points in time or time durations, at which driving noises are changed, etc. Electric vehicles, by nature, create hardly any driving noises. In order to create awareness, the driving noises are artificially created in addition to the vehicle's own quiet driving noises, depending upon the situation. The artificial driving noises may also be derived from motor vehicles 10 which are not electric vehicles, or from motor vehicles 10 with at least one electric drive (such as hybrid vehicles). For each vehicle type, special driving noises could be designed specific to a certain vehicle type so that people can get used to and recognize a typical sound. However, the driving noises should be designed in such a way that they nevertheless still sound pleasant amidst the traffic and do not become a nuisance.

The term "environmental sensor unit 11", as used herein, refers to a vehicle-internal unit which records vehicle-external parameters in an optical, acoustic, electromagnetic etc., manner. The signals received back as a function of the recorded parameters are evaluated by object in an evaluation unit (for example control unit 14 or environmental sensor unit 11) and are given a value. On this basis corresponding driving noises are created artificially. The environmental sensor unit 11 can comprise at least one of a camera, a radar system, a lidar system (light detection and ranging system), an infrared system and/or an ultrasound system, also in any random combination. The environmental sensor unit 11 may utilize digital maps in order to detect the exact road layout or the position. On digital maps the roads may be correspondingly classified and the properties of the driving noises should be generated accordingly. On digital maps the road layouts are very accurately defined, making it clear which zones should be scanned for objects as with other road users 20. If a navigation system with route guidance is activated, the proposed driving route can generally be utilized as the area for objects to be recorded. The environmental sensor unit 11 may be designed as a single unit which can be integrated with control unit 14, or it can comprise a plurality of individual units which, at any rate, are already partly arranged inside motor vehicle 10 for other purposes. As such, radar beams or IR/US beams may be emitted from a distance warning system already present in the motor vehicle 10. In case cameras are already arranged in the motor vehicle 10 for other purposes such as for detecting traffic signs 21 for speed limits, these may be utilized for the purpose of detecting other objects (traffic signs 21, road users 20, etc.). Also information which arrives telemetrically from outside (GPS, internet, mobile radio, radio signals etc.) can be utilized for detecting objects, positions or road layouts etc.

Further, a so-called car-to-car communication or car-to-pedestrian communication can be performed in order to record other road users 20. It is also possible for the environmental sensor unit 11 to detect the road infrastructure by means of various objects along the roads (such as crash barriers, center line, hard shoulder, parked motor vehicles, signposts, road markings, etc.), in order to adjust the driving noises on the basis of the driving situation.

In another exemplary embodiment, a sound proposed for certain zones or another noise can be communicated via car-to-X communication on entering this zone resulting in all vehicles emitting the same sound or the same noise.

Furthermore the transmission of music would be feasible. In one example, music from the radio could be transmitted and emitted. In order for all vehicles to emit the same music, a fixed radio frequency for emitting in a particular zone could be specified.

It would also be feasible to transmit and immediately emit any other real time sounds.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A method for generating artificial driving noises in a motor vehicle, comprising:
   emitting and receiving at least one of optical, acoustic and electromagnetic signals with the aid of an environmental sensor unit in order to record objects;
   controlling the emission of signals by a control unit;
   evaluating the received signals by the control unit;
   generating by a sound generating unit in communication with the control unit artificial driving noises and acoustically emitting the artificial driving noises to the outside; and
   modifying properties of the artificial driving noises based on a trailer being attached to the motor vehicle, wherein the properties of the artificial driving noises are based on the evaluation of at least one of the received signals, the objects recorded and vehicle-internal data, and the properties of the artificial driving noises are modified based on a detection of the attached trailer and a weight of the trailer load.

2. The method according to claim 1, wherein the properties of the artificial driving noises are based on a location of the motor vehicle detected via the environmental sensor unit.

3. The method according to claim 1, wherein the properties of the artificial driving noises are based on the relative speed between the motor vehicle and the recorded object.

4. The method according to claim 1, wherein the properties of the artificial driving noises are based on at least one of a recorded movement and a type of recorded object.

5. The method according to claim 1, wherein the properties of the artificial driving noises are based on the vehicle-internal data for a current driving style or a driving style stored for a driver.

6. The method according to claim 1, wherein the properties of the artificial driving noises are based on a current driving speed or an acceleration of the motor vehicle.

7. The method according to claim 1, wherein the properties of the artificial driving noises are based on a current geographical position of the motor vehicle ascertained via a positioning system.

8. The method according to claim 1, wherein the properties of the artificial driving noises are individually selectable and stored by a driver.

9. The method according to claim 1, wherein the properties of the artificial driving noises are based on at least one of a type and an intensity of the environmental conditions currently recorded via the environmental sensor unit.

10. The method according to claim 1, wherein the properties of the artificial driving noises are based on a type of the motor vehicle and a kind of the motor vehicle.

11. The method according to claim 1, wherein the properties of the artificial driving noises are based on information conveyed via at least one of car-to-car communication and car-to-X communication.

12. The method according to claim 1, wherein the properties of the artificial driving noises are based on road signs detected via the environmental sensor unit.

13. The method according to claim 12, wherein the environmental sensor unit further comprises at least one camera.

14. A vehicle, comprising:
a control unit having a programmable processor unit and a program code which when executed on the programmable processor unit causes a method to be carried out comprising:
emitting and receiving at least one of optical, acoustic and electromagnetic signals with the aid of an environmental sensor unit in order to record objects;
controlling the emission of signals by a control unit;
evaluating the received signals by the control unit;
generating by a sound generating unit in communication with the control unit artificial driving noises and acoustically emitting the artificial driving noises to the outside of a motor vehicle,
modifying properties of the artificial driving noises based on a trailer being attached to the motor vehicle; and
wherein the properties of the artificial driving noises are based on the evaluation of at least one of the received signals, the objects recorded, vehicle-internal data and a location of the motor vehicle detected via the environmental sensor unit and the properties of the artificial driving noises are modified based on a detection of the attached trailer and a weight of the trailer load.

15. A device for generating artificial driving noises of a vehicle, comprising:
an environmental sensor unit designed to emit and receiver at least one of optical, acoustic and electromagnetic signals in order to record objects in the surrounding area;
a control unit designed to control the transmission emission of signals and to evaluate received signals; and
a sound generating unit controllable by the control unit such that artificial driving noises with appropriate properties are generated and acoustically emitted to outside of the vehicle based on at least one of the recorded objects and vehicle-internal data,
wherein the properties of the artificial driving noises are modified based on a detection of a trailer attached to the vehicle and a weight of the trailer load.

16. The device according to claim 15, wherein the properties of the driving noises are based on a current driving speed or an acceleration of the vehicle.

17. The device according to claim 15, wherein the properties of the driving noises are based on a current geographical position of the vehicle ascertained via a positioning system.

* * * * *